United States Patent
Hooli et al.

(10) Patent No.: US 8,842,762 B2
(45) Date of Patent: Sep. 23, 2014

(54) REFERENCE SIGNAL RESOURCE RANDOMIZATION WITH SU-MIMO

(75) Inventors: Kari J. Hooli, Oulu (FI); Timo E. Lunttila, Espoo (FI); Kari P. Pajukoski, Oulu (FI); Esa T. Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 801 days.

(21) Appl. No.: 12/928,713

(22) Filed: Dec. 16, 2010

(65) Prior Publication Data

US 2011/0150120 A1    Jun. 23, 2011

Related U.S. Application Data

(60) Provisional application No. 61/287,752, filed on Dec. 18, 2009.

(51) Int. Cl.
*H04L 5/00* (2006.01)

(52) U.S. Cl.
CPC ............ *H04L 5/0051* (2013.01); *H04L 5/0023* (2013.01)
USPC ......................................................... 375/267

(58) Field of Classification Search
CPC ........ H04L 5/00; H04L 5/0014; H04L 5/0023
USPC ......................................... 375/259, 260, 267
See application file for complete search history.

(56) References Cited

U.S. PATENT DOCUMENTS

| | | | |
|---|---|---|---|
| 2008/0234930 A1* | 9/2008 | Cheok et al. | 701/207 |
| 2009/0022049 A1* | 1/2009 | Zeng | 370/203 |
| 2009/0262856 A1* | 10/2009 | Onggosanusi et al. | 375/267 |
| 2010/0211844 A1* | 8/2010 | Yuda et al. | 714/749 |
| 2012/0140838 A1* | 6/2012 | Kadous et al. | 375/267 |

FOREIGN PATENT DOCUMENTS

| | | |
|---|---|---|
| WO | WO 2008/132073 | 11/2008 |
| WO | WO 2009041034 A1 * | 4/2009 |

OTHER PUBLICATIONS

Nokia Siemens Networks et al: Cyclic Shift Hopping and DM RS Signaling, 3GPP Draft: R1-073644, 3rd Generation Partnership Project (3GPP), Mobile Competence Centre; vol. RAN WG1, No. Athens, Greece; Aug. 15, 2007, XP050107240.*

(Continued)

*Primary Examiner* — Kevin M Burd
(74) *Attorney, Agent, or Firm* — Harrington & Smith (57) ABSTRACT

For an integer number R (greater than one) of demodulation reference signal DM RS resources that are reserved for SU-MIMO transmissions by a UE, there is associated in a memory a) for a first transmission instance each of the R DM RS resources with a unique one of R spatial layers or R transmit antennas, and b) for a second transmission instance each of the R DM RS resources with a different unique one of the R spatial layers or transmit antennas. The first and second transmission instances (slots or sub-frames) are consecutive. A UE transmission to a network in the first slot/sub-frame comprises each DM RS resource on the respective spatial layer or transmit antenna with which they are associated for the first slot/sub-frame, and a UE transmission to the network in the first slot/sub-frame comprises each DM RS resource on the respective spatial layer or transmit antenna with which they are associated for the second slot/sub-frame.

21 Claims, 3 Drawing Sheets

(56) References Cited

OTHER PUBLICATIONS

3GPP TS 36.300, V8.6.0 (Sep. 2008) Evolved Universal Terrestrial Radio Access (E-UTRA) and Evolved Universal Terrestrial Radio Access Network (E-UTRAN) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TR 36.913, V8.0.0 (Jun. 2008) Requirements for further advancements for Evolved Universal Terrestrial Radio Access (E-UTRA) (LTE-Advanced) 3rd Generation Partnership Project; Technical Specification Group Radio Access Network; Requirements for Further Advancements for E-UTRA (LTE-Advanced), (Release 8).

3GPP TR 36.814, V0.4.1 (Feb. 2009) 3rd Generation Partnership Project; Technical Specification Group Radio Access Network; Further Advancements for E-UTRA Physical Layer Aspects (Release 9).

"Cyclic Shift Hopping and DM RS Signaling", 3GPP TSG RAN WG1 Meeting #50, Athens, Greece, Aug. 20-24, 2007, R1-07364.

"Randomization for ACK/NACK Signals Transmitted on PUCCH", 3GPP TSG RAN WG1 Meeting #49bis, Orlando, USA, Jun. 25-29, 2007, R1-073005.

"Further Discussion on UL Reference Signals", 3GPP TSG RAN WG1 Meeting #47, Riga, Nov. 6-10, 2006, R1-063105.

"UL RS Enhancement for LTE-Advanced" 3GPP TSG RAN WG1 Meeting #58, Shenzhen, China, Aug. 24-28, 2009, R1-093506.

"Further Consideration on Uplink RS Hopping and Grouping", 3GPP TSG RAN WG1 Meeting #50, Athens, Greece, Aug. 20-24, 2007, R1-073627.

\* cited by examiner

REFERENCE SIGNAL RESOURCE RANDOMIZATION WITH SU-MIMO

CROSS REFERENCE TO RELATED APPLICATION

This Application claims the benefit under 35 USC 119(e) of U.S. Provisional Application No. 61/287,752, filed Dec. 18, 2009.

TECHNICAL FIELD

The exemplary and non-limiting embodiments of this invention relate generally to wireless communication systems, methods, devices and computer programs and, more specifically, relate to reference signals and their resources in multiple input-multiple output communications.

BACKGROUND

Various abbreviations that appear in the specification and/or in the drawing figures are defined as follows:

| | |
|---|---|
| 3GPP | third generation partnership project |
| ACK | acknowledge |
| CS | cyclic shift |
| DM RS | demodulation reference signal |
| eNB | base station of an EUTRAN/LTE system |
| E-UTRAN | evolved UTRAN (also referred to as LTE or 3.9G) |
| IFDMA | interleaved frequency domain multiple access |
| ITU | international telecommunication union |
| ITU-R | ITU radiocommunication sector |
| LTE | long term evolution |
| MU-MIMO | multi-user multiple input multiple output |
| NACK | negative ACK |
| OCC | orthogonal cover code |
| OFDMA | orthogonal frequency division multiple access |
| PUCCH | physical uplink control channel |
| PUSCH | physical uplink shared channel |
| Rel. Aug. 9, 2010 | 3GPP Release Aug. 9, 2010 |
| RRC | radio resource control |
| SC-FDMA | single carrier frequency division multiple access |
| SU-MIMO | single-user multiple input multiple output |
| SRI | scheduling request indicator |
| SRS | sounding reference signal |
| UE | user equipment |
| UTRA | universal mobile telecommunication system terrestrial radio access |
| UTRAN | UTRA network |

Figure 1:
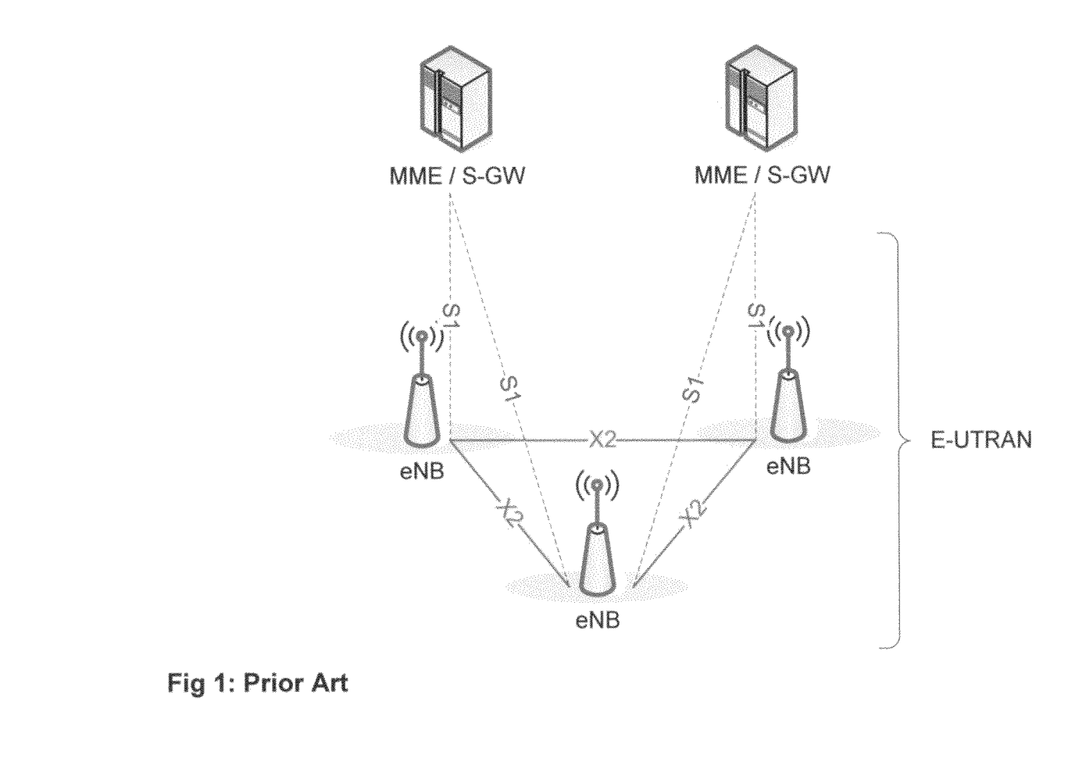
FIG. 1 reproduces FIG. 4.1 of 3GPP TS 36.300, and shows the overall architecture of the E-UTRAN system.

FIG. 1 reproduces FIG. 4.1 of 3GPP TS 36.300, V8.6.0 (2008-09), and shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an evolved packet core EPC, more specifically to a Mobility Management Entity MME and to a Serving Gateway SG. The S1 interface supports a many to many relationship between MMEs/SGs and eNBs.

Of particular interest herein are the further releases of 3GPP LTE targeted towards future IMT-A systems, referred to herein for convenience simply as LTE-Advanced (LTE-A). LTE-A is directed toward extending and optimizing the 3GPP LTE Rel 8 radio access technologies to provide higher data rates at very low cost. LTE-A will most likely be part of LTE Rel 10 and is expected to use a mix of local area and wide area optimization techniques to fulfil the ITU-R requirements for IMT-Advanced while keeping the backward compatibility with LTE Rel 8. The 3GPP has opened a study item in LTE Rel 10 for introducing uplink SU-MIMO with 2 or 4 transmission antennas at the UE.

It has been agreed that cyclic shift (CS) separation is to be the primary multiplexing scheme of the DM RSs in LTE-Advanced. CS separation is used already in Rel-8, to multiplex DM RS of different UEs in the case of MU-MIMO.

There have been some proposals to use an orthogonal cover code (OCC) as a complementary multiplexing scheme for that CS separation. Such proposals assert that the number of orthogonal reference signals can be increased, different transmission (TX) bandwidths can be supported for different UEs with MU-MIMO pairing, and the orthogonality between multiplexed DM RSs would be improved. Some competing proposals would use IFDMA as a complementary multiplexing scheme for the CS separation.

The inventors herein view one problem for a SU-MIMO implementation as how to improve the cross correlation properties of different SU-MIMO DM RSs, which are not addressed by the above proposals.

One proposal to randomize the cyclic shifts between two slots of the sub-frame can be seen at publication WO 2008/132073, entitled "Coordinated Cyclic Shift and Sequence Hopping for Zadoff-Chu, Modified Zadoff-Chu, and Block-Wise Spreading Sequences". The randomization scheme discussed there uses a "clock-table" remapping, but it does not appear to be backwards compatible with Release 8, and it does not appear to specifically account for the possible new extensions such as OCC and IFDMA.

SUMMARY

In accordance with a first aspect of the invention there is provided a method comprising storing in a computer readable memory of an apparatus a number R of user equipment reserved demodulation reference signal resources for single user multiple input multiple output transmissions, in which R is an integer greater than one; associating in the memory for a first transmission instance each of the R demodulation reference signal resources with a unique one of R spatial layers or R transmit antennas; and associating in the memory for a second transmission instance each of the R demodulation reference signal resources with a different unique one of the R spatial layers or transmit antennas, in which the second transmission instance is consecutive with the first transmission instance.

In accordance with a second aspect of the invention there is provided an apparatus comprising at least one processor and at least one memory in which is stored a program of computer readable instructions and a number R of user equipment reserved demodulation reference signal resources for single user multiple input multiple output transmissions. In this embodiment R is an integer greater than one. In this second aspect the processor is configured to operate with the memory and the stored program to cause the apparatus to associate for a first transmission instance each of the R demodulation reference signal resources with a unique one of R spatial layers or R transmit antennas; and to associate for a second transmission instance each of the R demodulation reference signal resources with a different unique one of the R spatial layers or transmit antennas, in which the second transmission instance is consecutive with the first transmission instance.

In accordance with a third aspect of the invention there is provided a memory storing a program of instructions that when executed by a processor result in actions directed toward associating resources with spatial layers. In this third aspect the actions comprise: accessing a computer readable storage medium to determine a number R of user equipment reserved demodulation reference signal resources for single user multiple input multiple output transmissions, in which R is an integer greater than one; associating in the storage medium for a first transmission instance each of the R demodulation reference signal resources with a unique one of R spatial layers or R transmit antennas; and associating in the storage medium for a second transmission instance each of the R demodulation reference signal resources with a different unique one of the R spatial layers or transmit antennas, in which the second transmission instance is consecutive with the first transmission instance.

In accordance with a fourth aspect of the invention there is provided an apparatus memory means and processing means. The memory means if for storing a number R of user equipment reserved demodulation reference signal resources for single user multiple input multiple output transmissions, in which R is an integer greater than one. The processing means is for associating for a first transmission instance each of the R demodulation reference signal resources with a unique one of R spatial layers or R transmit antennas, and for associating for a second transmission instance each of the R demodulation reference signal resources with a different unique one of R spatial layers or transmit antennas, in which the second transmission instance is consecutive with the first transmission instance.

BRIEF DESCRIPTION OF THE DRAWINGS

The foregoing and other aspects of the exemplary embodiments of this invention are made more evident in the following Detailed Description, when read in conjunction with the attached Drawing Figures.

DETAILED DESCRIPTION

The specific examples below detail a multi-antenna transmission arrangement using DM RS resources for the case of SU-MIMO as it is expected to be implemented in LTE-A/Release 10. It is understood that such examples are non-limiting and these teachings may be readily extended to other wireless communication systems that use different terminology than that used herein to correspond to an LTE system.

As noted above, the inventors consider that one problem in considering how to use DM RS resources in LTE-A concerns the cross-correlation properties of different SU-MIMO DM RSs that are reserved for different spatial layers and/or transmit antennas of the single user. Consider a specific example to illustrate the point. Assume one UE with four transmit antennas transmits DM RSs on four cyclic shifts. These four cyclic shifts are the DM RS resources. The separation between shifts is predetermined, and typically constant. If the propagation channel corresponding to some of the DM RS resources happens to have a larger delay spread than some others, the different DM RS resources experience different intra-cell interference. Absent some fix the channel with the long delay spread would always interfere with the same neighboring resource. Varying the DM RS resources in consecutive time slots randomizes the interference which improves the signal to interference plus noise ratio (SINR) of the DM RSs on the different resources. This also improves the performance of the channel estimation process. Note that this 'randomization' of the interference is not necessarily done by randomly generating some assignment of DM RS resource to antenna; it can be done by a pre-defined algorithm as will be detailed below and still 'randomize' the interference to an extent that the cross-correlation is appreciably reduced.

For the SU-MIMO case the DM RS resources should be arranged in such a way that cross-correlation properties against the other UEs following the Rel-8 DM RS resource randomization principle are maintained. This leads to a two-fold design problem for arranging the SU-M IMO DM RS resources: one should take into account the cross-correlation properties between DM RS resources reserved for MU-MIMO, and also the cross-correlation properties with the other cells.

Two further considerations present themselves. The possible new DM RS resource extensions mentioned above (for example OCC and IFDMA) should be taken into account when considering how to arrange the SU-MIMO DM RS resources; and the solution should be both simple to implement and scalable up to at least four spatial layers/transmit antennas at the SU-MIMO UE. Note also that during development of LTE Release 8, much effort went into optimizing the RS resource orthogonality by applying sequence hopping and other techniques, and a similar design approach is likely in LTE Release 10 so that all the degrees of diversity and randomization will be utilized.

In an exemplary aspect, embodiments of these teachings provide for a 'randomization' of the DM RS resources across the different spatial layers or transmit antennas in consecutive timeslots for a SU-MIMO transmission. As will be seen below, this assures an intra-cell randomization and so reduces intra-cell DM RS cross correlation. LTE Rel-8 does employ some DM RS resource randomization but it is not randomized within a cell; it targets DM RS inter-cell interference by means of cyclic shift hopping based on a pseudo-random hopping pattern (which is cell-specific), cyclic shift hops for every slot on PUSCH, and sequence hopping/sequence group hopping.

In example embodiments of these teachings there is a randomization among the DM RS resources that are reserved for SU-MIMO (which means a randomization among the spatial layers). These resources can be one or more of the following:

Cyclic shifts,
Orthogonal Cover Codes, and
Transmission combs (in the case of IFDMA).

These three types of resources are known specifically in LTE. Cyclic shifts and orthogonal codes are also known in other wireless systems. Transmission combs are a distributed transmission which give the UE a way to multiplex its reference signals in addition to the cyclic shifts. For example, the UE can send a SRS in the last SC-FDMA symbol of the sub-frame and distributed among every other sub-carrier. The related offsets of those sub-carriers defines one particular transmission comb. The number of transmission combs in LTE that are provided by IFDMA depends on the repetition factor (RPF) which corresponds to two for the above example case of SRS in LTE. The above three resource types are not mutually exclusive; for example cyclic shifts and transmission combs can be used at the same time.

It is important to note that in this example embodiment, the DM RS resource randomization takes place between the reserved resources rather than between the entire physical resources. This assures that this exemplary embodiment of the invention remains backwards compatible with 3GPP Rel-8.

In an example embodiment, regardless of the number of DM RS resources reserved, the randomization period equals always two slots of the same sub-frame, and/or two sub-frames. For the case of the two sub-frame randomization period, the randomization can be arranged between even and odd HARQ transmissions (and re-transmissions where applicable).

Note also that a similar randomization can be applied between sounding reference signal (SRS) transmissions when a SU-MIMO UE has multiple SRS resources allocated that are separated by cyclic shifts or transmission combs (as opposed to frequency and/or time division multiplexing).

To more clearly describe these teachings, below are several specific exemplary embodiments of the invention. These illustrate specific randomization patterns for SU-MIMO in the case of two, three and four spatial layers/transmit antennas. The case of one spatial layer/one transmit antenna is not applicable to these examples. In these following non-limiting examples, it is assumed the randomization period is two as noted above (for example, two slots of a sub-frame or two sub-frames), and further it is assumed that the occupied DM RS resources are A, B, C and D which corresponds to spatial layer/antenna—specific DM RS resources. This means that resource A corresponds to the first spatial layer or first transmit antenna, resource B corresponds to the second spatial layer or second antenna, and so on. Resources A, B, C and D are the pre-defined DM RS resources allocated for the UE. Note that in each of these example embodiments, the neighbour/consecutive resources are never in the same order in two consecutive transmission instances.

In a first example there are two DM RS resources reserved for the UE for SU-MIMO and the rank R is two. [Note that there is the possibility of two DM RS resources with rank R=1, for example where a rank-1 precoded PUSCH uses non-precoded DM RS resources and the number of antenna ports equals two.] In the first transmission instance (the first slot or sub-frame) DM RS resource A is associated with spatial layer or transmit antenna A, and DM RS resource B is associated with spatial layer or transmit antenna B. In the next consecutive (second) transmission instance (the second slot or sub-frame), DM RS resource A is associated with spatial layer or transmit antenna B, and DM RS resource B is associated with spatial layer or transmit antenna A.

In a second example there are three DM RS resources reserved for the UE for SU-MIMO and the rank R is three. In the first transmission instance DM RS resources A, B and C are associated with respective spatial layers or transmit antennas A, B, and C. In the second transmission instance, DM RS resources A, B and C are associated with respective spatial layers and/or transmit antennas B, A and C. This is an example only; other possible rotation patterns in the second transmission instance associate DM RS resources [A, B and C] with respective spatial layers or transmit antennas [C, B and A], or alternatively [A, C and B].

In a third example there are four DM RS resources reserved for the UE for SU-MIMO and the rank R is four. In the first transmission instance DM RS resources A, B, C and D are associated with respective spatial layers or transmit antennas A, B, C and D. In the second transmission instance, DM RS resources A, B, C and D are associated with respective spatial layers or transmit antennas B, A, D and C. Other possible rotation patterns in the second transmission instance associate DM RS resources [A, B, C and D] with respective spatial layers or transmit antennas [A, D, C, B]; or [D, C, B, A], or alternatively [C, B, A, D].

The following chart sums up some of the above examples:

|  | R = 2 | R = 3 | R = 4 |
| --- | --- | --- | --- |
| DM RS resources (both instances) | A, B | A, B, C | A, B, C, D |
| 1st instance spatial layer/transmit ant. | A, B | A, B, C | A, B, C, D |
| 2nd instance spatial layer/transmit ant. | B, A | B, A, C | B, A, D, C |

The DM RS resource randomization patterns, or DM RS resource re-mapping, can also be expressed as an algorithm stored in the memory which the UE executes to make the association of the R DM RS resources that are allocated to it for SU-MIMO to the spatial layers or transmit antennas for the various transmission intervals. For example, the specific resource re-mappings shown above may be expressed as the following algorithm:

$1^{st}$ transmission instance: $n_{layer}(k)=n_{DMRS}(k)$, k=0, 1, ... R−1, $2^{nd}$ transmission instance: $n_{layer}(k)=n_{DMRS}[(A-k) \mod R]$, k=0, 1, ... R−1, where $n_{layer}(k)$ is the DM RS resource for layer k, $n_{DMRS}(k)$ is the kth allocated resource, and R is the transmission rank. The offset integer A may be a constant or, alternatively, the value of the offset A may depend on the rank R. In the above examples, the offset A was set to one.

Note that in the above R=2 example, true randomization is not achieved on SU-MIMO rank 2 transmission alone due to the circular nature of cyclic shifts. However, randomization is achieved also in this case when the SU-MIMO rank 2 transmission is part of a MU-MIMO transmission with total rank greater than 2.

In an example embodiment the UE implements the above DM RS resource randomization automatically and without any explicit control signalling by the eNB. In another example embodiment the eNB signals the UE using RRC signalling to turn the DM RS resource randomization on and off.

DM RS resource randomization for SU-MIMO according to the example embodiments presented herein can be used on control channels such as the PUCCH for the UE to send its ACK, NACK and SRI, and/or on the PUSCH for the UE to send its data. The DM RSs can be constant amplitude zero-autocorrelation root sequences (for example, Zadoff-Chu sequences) with some cyclic shift as noted above. Additionally, these example embodiments also support possible DM RS resource extensions such as OCC and IFDMA.

Figure 2:
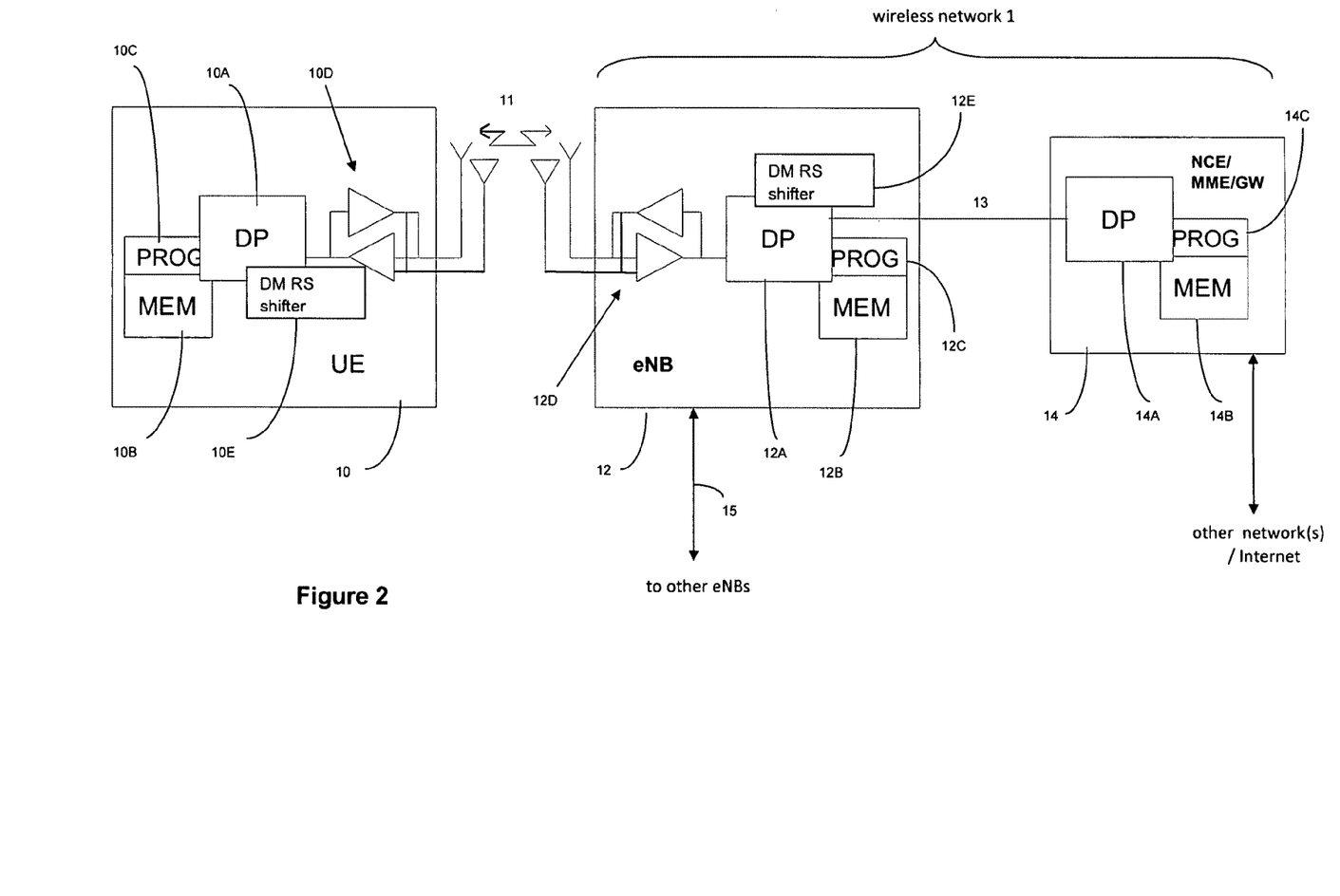
FIG. 2 shows a simplified block diagram of various electronic devices that are suitable for use in practicing the exemplary embodiments of this invention.

Reference is now made to FIG. 2 for illustrating a simplified block diagram of various electronic devices that are suitable for use in practicing the exemplary embodiments of this invention. In FIG. 2a wireless network 1 is adapted for communication with an apparatus, such as a mobile communication device referred to as a UE 10, via a network access node, such as a Node B (base station), and more specifically an eNB 12. The network 1 may include a network control element (NCE) 14 that may include the MME/S-GW functionality shown in FIG. 1, and which provides connectivity with another network, such as a publicly switched telephone network and/or a data communications network (e.g., the internet). The UE 10 includes a data processor (DP) 10A, a memory (MEM) 10B that stores a program (PROG) 10C of computer readable instructions, and a suitable radio frequency (RF) transmitter and receiver 10D for bidirectional wireless communications with the eNB 12, which also includes a DP 12A, a MEM 12B that stores a PROG 12C, and a suitable RF transmitter and receiver 12D. Those communications are over channels 11 noted above by example, such as the PUCCH and the PUSCH. The UE 10 sends its SU-MIMO transmissions via two or more antennas, although it may use one or more of the antennas for reception without departing from these teachings. It is also possible that the uplink SU-MIMO capable terminal operates in a single-antenna-port mode where the UE appears as non-MIMO terminal from the eNB point of view. The eNB 12 has at least one transmit antenna but typically an array of multiple antennas to support its own MU-MIMO transmissions to and receptions from multiple UEs of which one or more may at any instant be engaging in SU-MIMO transmissions according to these teachings. The eNB 12 is coupled via a modem (not shown) and a data path 13 to a modem (not shown) of the NCE 14. That data path 13 may be implemented as an S1 interface as shown at FIG. 1. An instance of an X2 interface 15 may be present for coupling to another eNB as FIG. 2 indicates.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by stored computer software executable by the DP 10A of the UE 10 and/or by the DP 12A of the eNB 12, or by hardware, or by a combination of stored software and hardware (and firmware).

For the purposes of describing the exemplary embodiments of this invention the UE 10 may be assumed to also include a DM RS resource shifter 10E, and the eNB 12 may include a DM RS resource shifter 12E. These shifters 10E, 12E operate to make the associations/mappings of DM RS resource to spatial level/transmit antenna for the individual transmission instances as was detailed above. In an embodiment the DM RS resource shifters 10E, 12E are implemented in stored software; in another embodiment they are implemented in hardware (DP and/or other circuitry); and in a still further embodiment they are implemented in a combination of stored software and hardware and/or firmware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Typically there will be a plurality of UEs 10 in the cell serviced by the eNB 12, and these UEs may also multiplex their transmissions on the various PUCCHs to the eNB 12. The UEs 10 may or may not be identically constructed, but in general are all assumed to be electrically and logically compatible with the relevant network protocols and standards needed for operation in the wireless network 1.

Further details and implementations are described particularly below with reference to FIG. 3. While both the UE 10 and the eNB 12 can use these teachings for their own SU-MIMO transmissions, the more typical implementation is expected to be at the UE 10, which receives from the eNB 12 its set of R DM RS resources for SU-MIMO transmissions on the uplink. The eNB also knows the set of R DM RS resources which it reserved for the UE, and which the UE uses on its transmissions which the eNB receives. Receiving the set of R DM RS resources at the UE does not require the eNB 12 to send that set directly; the UE 10 can instead receive from the eNB 12 all the necessary information to derive that set of R DM RS resources. From the perspective of the UE or the eNB, exemplary embodiments of this invention encompass a method; an apparatus that includes a processor and memory storing a program and possibly also a transmitter and a receiver; and a memory embodying a computer program; that operate along the lines shown at FIG. 3 and detailed more particularly above.

Specifically, at block 302 the UE or the eNB stores in a computer readable memory a number R of demodulation reference signal resources for single user multiple input multiple output transmissions; these R DM RSs are reserved for the UE. R is an integer greater than one, and the DM RS resources that are reserved for the UE's SU-MIMO transmissions is less than all of the DM RS resources in use in the whole cell. In an embodiment, the UE learns which DM RS resources are reserved for it for SU-MIMO, which are all of the R DM RS resources, from signaling received from the eNB 12.

The UE 10 or eNB 12 then at block 304 associates in its memory, for a first transmission instance, each of the R demodulation reference signal resources with a unique one of R spatial layers or of R transmit antennas. At block 306 the UE 10 or eNB 12 associates in its memory, for a second transmission instance, each of the R demodulation reference signal resources with a different unique one of the R spatial layers or transmit antennas, in which the second transmission instance is consecutive with the first transmission instance.

In one particular embodiment from the UE perspective, the associating in the memory for the first transmission instance further comprises at block 304A transmitting from the UE 10 in the first transmission instance each of the R demodulation reference signal resources on the respective spatial layer or transmit antenna with which they are associated for the first transmission instance. In this particular embodiment, associating in the memory for the second transmission instance further comprises as shown at block 306A transmitting from the UE 10 in the second transmission instance each of the R demodulation reference signal resources on the respective spatial layer or transmit antenna with which they are associated for the second transmission instance. From the eNB perspective the transmissions in the first and second transmission instances are received at the eNB 12 from the UE 10.

In another example embodiment from the UE or the eNB perspective, the different unique ones of the R spatial layers or transmit antennas for the second transmission instance are randomized in their association with the R demodulation reference signal resources as compared to the unique ones of the R spatial layers or transmit antennas for the first transmission instance. As noted above, in example embodiments the randomization occurs over a randomization period that equals two transmission instances.

In another example embodiment from the UE or the eNB perspective and as shown at block 308, regardless of the value of R the first and second transmission instances comprise either different slots of a sub-frame, or alternating sub-frames of HARQ transmissions or re-transmissions.

Another example embodiment from the UE perspective has the transmitting from the UE 10 in the first and in the second transmission instances comprising single-user multiple input-multiple output SU-MIMO transmissions. From the eNB 12 perspective the transmissions received from the UE 10 are SU-MIMO transmissions.

Another example embodiment from the UE or the eNB perspective has R being a rank of the SU-MIMO transmissions, and further where the demodulation reference signal resources comprise at least one of cyclic shifts, orthogonal cover codes, and transmission combs.

Figure 3:
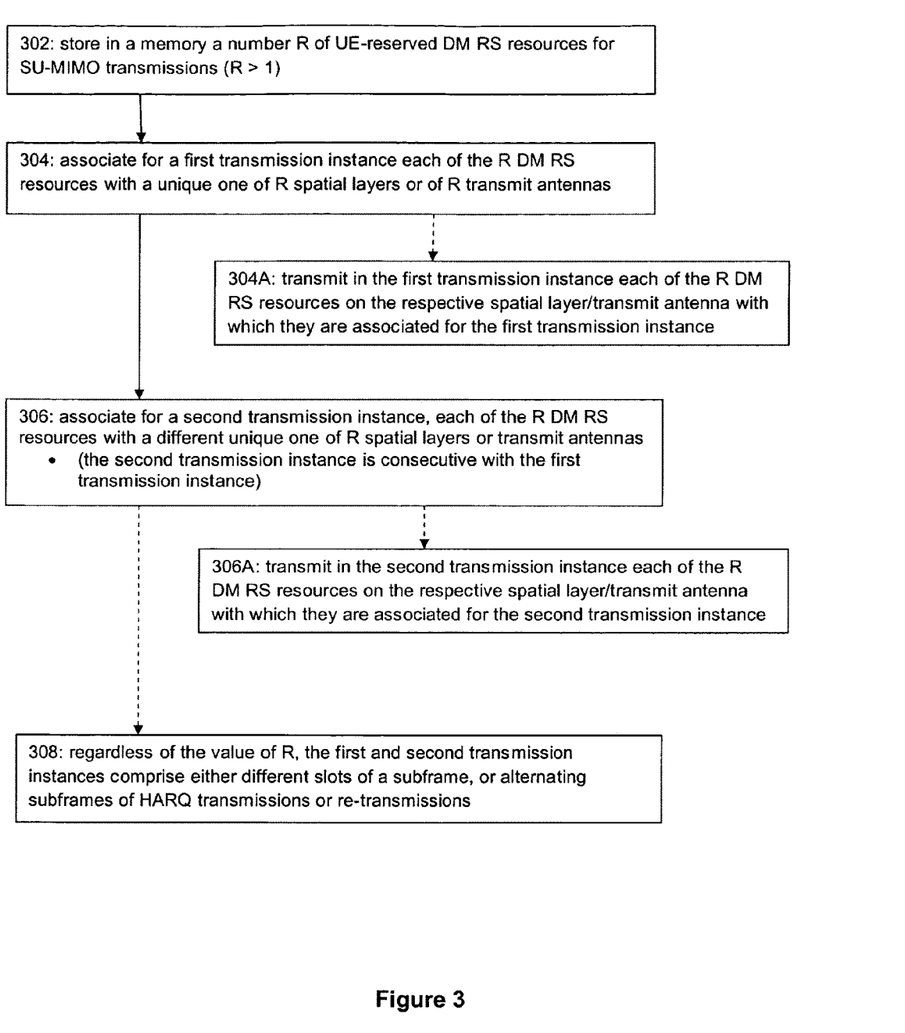
FIG. 3 is a logic flow diagram that illustrates the operation of a method, and a result of execution of computer program instructions embodied on a computer readable memory, in accordance with the exemplary embodiments of this invention.

Another example embodiment from the UE perspective is that the method represented by FIG. 3 is performed in reply to the UE 10 receiving radio resource control signaling from a wireless network 1 to turn on demodulation reference signal resource randomization. From the eNB perspective it is the eNB which sends the RRC signaling for which the transmissions at FIG. 3 are received in reply.

Another example embodiment from the UE or the eNB perspective, in which associating for the first and for the second transmission instance comprise the UE or eNB executing an algorithm stored in the memory that associates each of the DM RS resources with a different $k^{th}$ spatial layer or $k^{th}$ transmit antenna for each of the first and second transmission instance, where k indexes through all R demodulation reference signal resources and spatial layers/transmit antennas.

Note that the various blocks shown in FIG. 3 for a particular entity (UE or eNB) may be viewed as method steps, and/or as operations that result from operation of computer program code, and/or as a plurality of coupled logic circuit elements constructed to carry out the associated function(s).

In one exemplary embodiment of this invention there is an apparatus comprising at least one processor and at least one memory storing a program of computer readable instructions and storing a number R of demodulation reference signal resources that are reserved for single user multiple input multiple output transmissions, in which R is an integer greater than one. In this embodiment the processor is configured to operate with the memory and the stored program to cause the apparatus to: a) associate for a first transmission instance each of the R demodulation reference signal resources with a unique one of R spatial layers or with R transmit antennas; and b) associate for a second transmission instance each of the R demodulation reference signal resources with a different unique one of the R spatial layers or transmit antennas, in which the second transmission instance is consecutive with the first transmission instance.

In another exemplary embodiment of this invention there is a memory storing a program of instructions that when executed by a processor result in actions directed toward associating resources with spatial layers or transmit antennas. In this embodiment the actions comprise accessing a computer readable storage medium to determine a number R of demodulation reference signal resources that are reserved for single user multiple input multiple output transmissions, in which R is an integer greater than one; associating in the storage medium for a first transmission instance each of the R demodulation reference signal resources with a unique one of R spatial layers or of R transmit antennas; and associating in the storage medium for a second transmission instance each of the R demodulation reference signal resources with a different unique one of the R spatial layers or transmit antennas, in which the second transmission instance is consecutive with the first transmission instance.

In still another exemplary embodiment of this invention there is an apparatus comprising memory means and processing means. The memory means is for storing a number R of demodulation reference signal resources that are reserved for single user multiple input multiple output transmissions. R is an integer greater than one. The processing means is for associating for a first transmission instance each of the R demodulation reference signal resources with a unique one of R spatial layers or of R transmit antennas. The processing means is further for associating for a second transmission instance each of the R demodulation reference signal resources with a different unique one of the R spatial layers or transmit antennas. The second transmission instance is consecutive with the first transmission instance.

In general, the various exemplary embodiments of the invention may be implemented in hardware or special purpose circuits, stored software, logic or any combination thereof. For example, some aspects may be implemented in hardware, while other aspects may be implemented in firmware or stored software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

Further, while the exemplary embodiments have been described above in the context of the LTE-A system, it should be appreciated that the exemplary embodiments of this invention are not limited for use with only this one particular type of wireless communication system, and that they may be used to advantage in other types of wireless communication systems such as for example LTE Release 8 and LTE Release 9.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electro-magnetic energy, such as electro-magnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

We claim:

1. A method comprising:
    storing in a non-transitory computer readable memory of an apparatus a number R of user equipment reserved demodulation reference signal resources for single user multiple input multiple output transmissions, in which R is an integer greater than one;
    associating in the memory for a first transmission instance each of the R demodulation reference signal resources with a unique one of R spatial layers or R transmit antennas;
    associating in the memory for a second transmission instance each of the R demodulation reference signal resources with a different unique one of the R spatial layers or transmit antennas, in which the second transmission instance is consecutive with the first transmission instance;
    communicating in the first transmission instance all of the respective R demodulation reference signal resources on all of the corresponding unique R spatial layers or R transmit antennas; and
    communicating in the second transmission instance all of the respective R demodulation reference signal resources on all of the corresponding different unique R spatial layers or R transmit antennas, wherein the R demodulation reference signal resources used in the consecutive first and second transmission instance are varied to randomize interference and improve a signal to interference plus noise ratio of demodulation reference signals transmitted in the consecutive first and second transmission instance.

2. The method according to claim 1, wherein the apparatus comprises a network access node which reserves the R demodulation reference signals for the user equipment, in which:
    communicating in the first transmission instance further comprises receiving at the network access node from the user equipment in the first transmission instance each of the R demodulation reference signal resources on the respective spatial layer or transmit antenna with which they are associated for the first transmission instance; and
    communicating in the second transmission instance further comprises receiving at the network access node from the user equipment in the second transmission instance each of the R demodulation reference signal resources on the respective spatial layer or transmit antenna with which they are associated for the second transmission instance.

3. The method according to claim 1, wherein:
    the different unique ones of the R spatial layers or transmit antennas for the second transmission instance are randomized in their association with the R demodulation reference signal resources as compared to the unique ones of the R spatial layers or transmit antennas for the first transmission instance, and
    the randomization occurs over a randomization period that equals two transmission instances.

4. The method according to claim 1, in which regardless of the value of R the first and second transmission instances comprise: different slots of a sub-frame; or alternating sub-frames of HARQ transmissions or re-transmissions.

5. The method according to claim 1, performed in reply to the apparatus receiving radio resource control signaling from a wireless network to turn on demodulation reference signal resource randomization.

6. The method according to claim 1, in which associating in the memory for the first and for the second transmission instance comprise executing an algorithm stored in the memory that associates each of the demodulation reference signal resources with a different $k^{th}$ spatial layer or transmit antenna for each of the first and second transmission instance, where k indexes through all R demodulation reference signal resources and spatial layers or transmit antennas.

7. The method according to claim 1, wherein the apparatus comprises the user equipment for which the R demodulation reference signals are reserved, in which:
    communicating in the first transmission instance further comprises transmitting from the user equipment in the first transmission instance each of the R demodulation reference signal resources on the respective spatial layer or transmit antenna with which they are associated for the first transmission instance; and
    communicating in the second transmission instance further comprises transmitting from the user equipment in the second transmission instance each of the R demodulation reference signal resources on the respective spatial layer or transmit antenna with which they are associated for the second transmission instance.

8. The method according to claim 7, in which the transmissions from the user equipment in the first and in the second transmission instances comprise single-user multiple input-multiple output SU-MIMO transmissions in a LTE-Advanced wireless network.

9. The method according to claim 8, in which R is a rank of the SU-MIMO transmissions and the demodulation reference signal resources comprise at least one of cyclic shifts, orthogonal cover codes, and transmission combs.

10. The method according to claim 1, wherein different unique spatial layers or transmit antennas are used for varying the R demodulation reference signal resources respectively transmitted in consecutive timeslots of a single user multiple input multiple output transmission.

11. An apparatus comprising:
    at least one processor, and
    at least one memory storing a computer program code and a number R of user equipment reserved demodulation reference signal resources for single user multiple input multiple output transmissions, in which R is an integer greater than one, wherein the at least one memory and the computer program code are configured, with the at least one processor, to cause the apparatus to:
    associate for a first transmission instance each of the R demodulation reference signal resources with a unique one of R spatial layers or R transmit antennas; and associate for a second transmission instance each of the R demodulation reference signal resources with a different unique one of the R spatial layers or transmit antennas, in which the second transmission instance is consecutive with the first transmission instance;

communicating in the first transmission instance all of the respective R demodulation reference signal resources on all of the corresponding unique R spatial layers or R transmit antennas; and communicating in the second transmission instance all of the respective R demodulation reference signal resources on all of the corresponding different unique R spatial layers or R transmit antennas, wherein the R demodulation reference signal resources used in the consecutive first and second transmission instance are varied to randomize interference and improve a signal to interference plus noise ratio of demodulation reference signals transmitted in the consecutive first and second transmission instance.

12. The apparatus according to claim 11, in which the apparatus comprises a network access node which reserves the R demodulation reference signals for the user equipment, and wherein the processor is configured to operate with the memory and the stored program to cause the network access node to further:

receive from the user equipment in the first transmission instance each of the R demodulation reference signal resources on the respective spatial layer or transmit antenna with which they are associated for the first transmission instance; and receive from the user equipment in the second transmission instance each of the R demodulation reference signal resources on the respective spatial layer or transmit antenna with which they are associated for the second transmission instance.

13. The apparatus according to claim 11, wherein the processor is configured to operate with the memory and the stored program to cause the apparatus to further:

randomize the different unique ones of the R spatial layers or transmit antennas for the second transmission instance in their association with the R demodulation reference signal resources as compared to the unique ones of the R spatial layers or transmit antennas for the first transmission instance;

in which the randomization occurs over a randomization period that equals two transmission instances.

14. The apparatus according to claim 11, in which regardless of the value of R the first and second transmission instances comprise: different slots of a sub-frame; or alternating sub-frames of HARQ transmissions or re-transmissions.

15. The apparatus according to claim 12, in which the transmissions from the user equipment in the first and in the second transmission instances comprise single-user multiple input-multiple output SU-MIMO transmissions in a LTE-Advanced wireless network.

16. The apparatus according to claim 15, in which R is a rank of the SU-MIMO transmissions and the demodulation reference signal resources comprise at least one of cyclic shifts, orthogonal cover codes, and transmission combs.

17. The apparatus according to claim 11, wherein the processor is configured to operate with the memory and the stored program to cause the apparatus to associate as said for the first and second transmission instances in reply to the apparatus receiving radio resource control signaling from a wireless network to turn on demodulation reference signal resource randomization.

18. The apparatus according to claim 11, in which the program comprises an algorithm which when executed by the processor associates each of the demodulation reference signal resources with a different $k^{th}$ spatial layer or transmit antenna for each of the first and second transmission instance, where k indexes through all R demodulation reference signal resources and spatial layers or transmit antennas.

19. The apparatus according to claim 11, in which the apparatus comprises the user equipment for which the R demodulation reference signals are reserved, and wherein the processor is configured to operate with the memory and the stored program to cause the user equipment to further:

transmit in the first transmission instance each of the R demodulation reference signal resources on the respective spatial layer or transmit antenna with which they are associated for the first transmission instance; and transmit in the second transmission instance each of the R demodulation reference signal resources on the respective spatial layer or transmit antenna with which they are associated for the second transmission instance.

20. A non-transitory computer readable memory storing a program of instructions that when executed by a processor result in actions directed toward associating resources with spatial layers, the actions comprising:

accessing a computer readable storage medium to determine a number R of user equipment reserved demodulation reference signal resources for single user multiple input multiple output transmissions, in which R is an integer greater than one;

associating in the storage medium for a first transmission instance each of the R demodulation reference signal resources with a unique one of R spatial layers or R transmit antennas;

associating in the storage medium for a second transmission instance each of the R demodulation reference signal resources with a different unique one of the R spatial layers or transmit antennas, in which the second transmission instance is consecutive with the first transmission instance;

communicating in the first transmission instance all of the respective R demodulation reference signal resources on all of the corresponding unique R spatial layers or R transmit antennas; and communicating in the second transmission instance all of the respective R demodulation reference signal resources on all of the corresponding different unique R spatial layers or R transmit antennas, wherein the R demodulation reference signal resources used in the consecutive first and second transmission instance are varied to randomize interference and improve a signal to interference plus noise ratio of demodulation reference signals transmitted in the consecutive first and second transmission instance.

21. The memory according to claim 20, wherein:

communicating in the first transmission instance further comprises transmitting or receiving in the first transmission instance each of the R demodulation reference signal resources on the respective spatial layer or transmit antenna with which they are associated for the first transmission instance; and communicating in the second transmission instance further comprises transmitting or receiving in the second transmission instance each of the R demodulation reference signal resources on the respective spatial layer or transmit antenna with which they are associated for the second transmission instance.

* * * * *